United States Patent
Gruhn et al.

(10) Patent No.: US 8,372,252 B2
(45) Date of Patent: Feb. 12, 2013

(54) METHOD FOR SETTING A DISTANCE BETWEEN AN ELECTRODE AND A WORKPIECE

(75) Inventors: Herbert Gruhn, Ludwigsburg (DE); Norman Krings, Ludwigsburg (DE); Juergen Hackenberg, Sachsenheim (DE); Alexander Reitzle, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 686 days.

(21) Appl. No.: 12/305,527

(22) PCT Filed: Sep. 6, 2007

(86) PCT No.: PCT/EP2007/059312
§ 371 (c)(1),
(2), (4) Date: Nov. 30, 2009

(87) PCT Pub. No.: WO2008/037574
PCT Pub. Date: Apr. 3, 2008

(65) Prior Publication Data
US 2010/0065437 A1 Mar. 18, 2010

(30) Foreign Application Priority Data
Sep. 27, 2006 (DE) .......................... 10 2006 045 664

(51) Int. Cl.
*C25D 17/16* (2006.01)
*B23H 7/26* (2006.01)
*B23H 3/02* (2006.01)
(52) U.S. Cl. .................... 204/222; 205/641; 205/642
(58) Field of Classification Search .................. 204/222; 205/642
See application file for complete search history.

(56) References Cited

U.S. PATENT DOCUMENTS

| | | | |
|---|---|---|---|
| 4,257,865 A | 3/1981 | Semashko et al. | |
| 4,491,718 A * | 1/1985 | Cook et al. ............... | 219/124.22 |
| 6,835,299 B1 * | 12/2004 | Tchugunov ................ | 205/654 |
| 6,896,143 B2 * | 5/2005 | Usui et al. ................ | 205/666 |
| 2006/0131184 A1 * | 6/2006 | Mielke ....................... | 205/651 |
| 2007/0256938 A1 * | 11/2007 | Fruth ......................... | 205/668 |

FOREIGN PATENT DOCUMENTS
WO WO 01/78930 10/2001

OTHER PUBLICATIONS
International Search Report, PCT/EP2007/059312 dated Dec. 6, 2007.

* cited by examiner

*Primary Examiner* — Harry D Wilkins, III
*Assistant Examiner* — Bryan D. Ripa
(74) *Attorney, Agent, or Firm* — Kenyon & Kenyon LLP

(57) ABSTRACT

In a method for setting the distance between an electrode and a workpiece in electrochemical metal working, the electrode is moved by an oscillating drive system, in which an acceleration signal of the oscillating drive system is picked up, the acceleration signal is divided into individual sections, characteristic magnitudes of the individual sections of the acceleration signal are determined, the characteristic magnitudes of the individual sections are compared to one another and the distance of the electrode from the workpiece is adjusted in response to a deviation of the characteristic magnitudes from the specified values. A device for carrying out the method includes an electrode, that is connected to a drive axis, an oscillating motion being able to be transferred to the electrode via the drive axis. A sensor is situated on the drive axis which picks up acceleration signals.

2 Claims, 4 Drawing Sheets

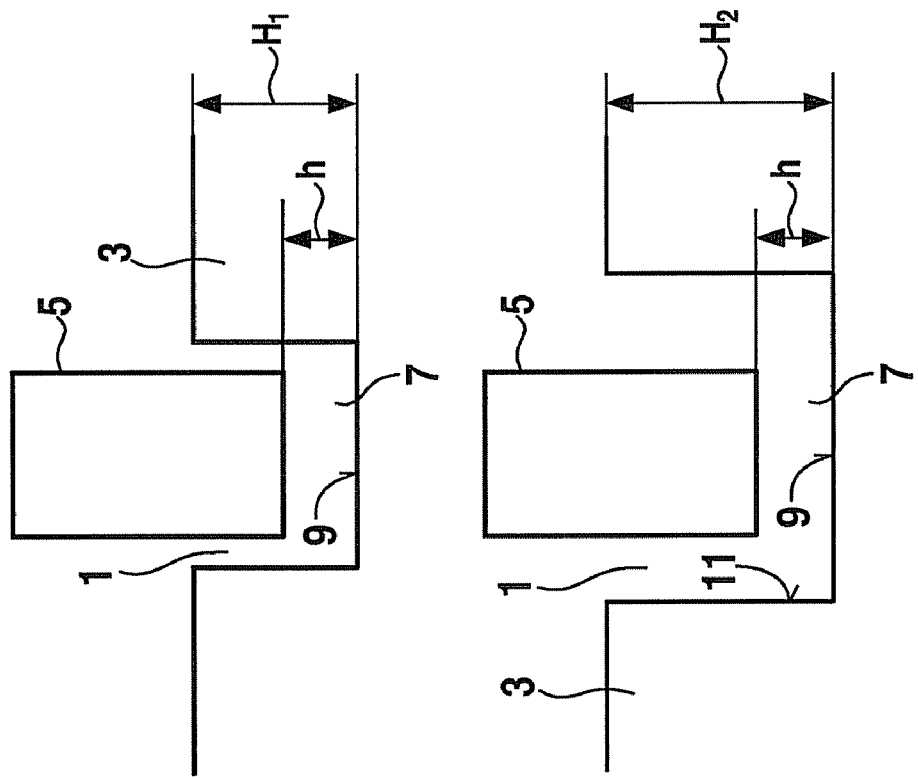
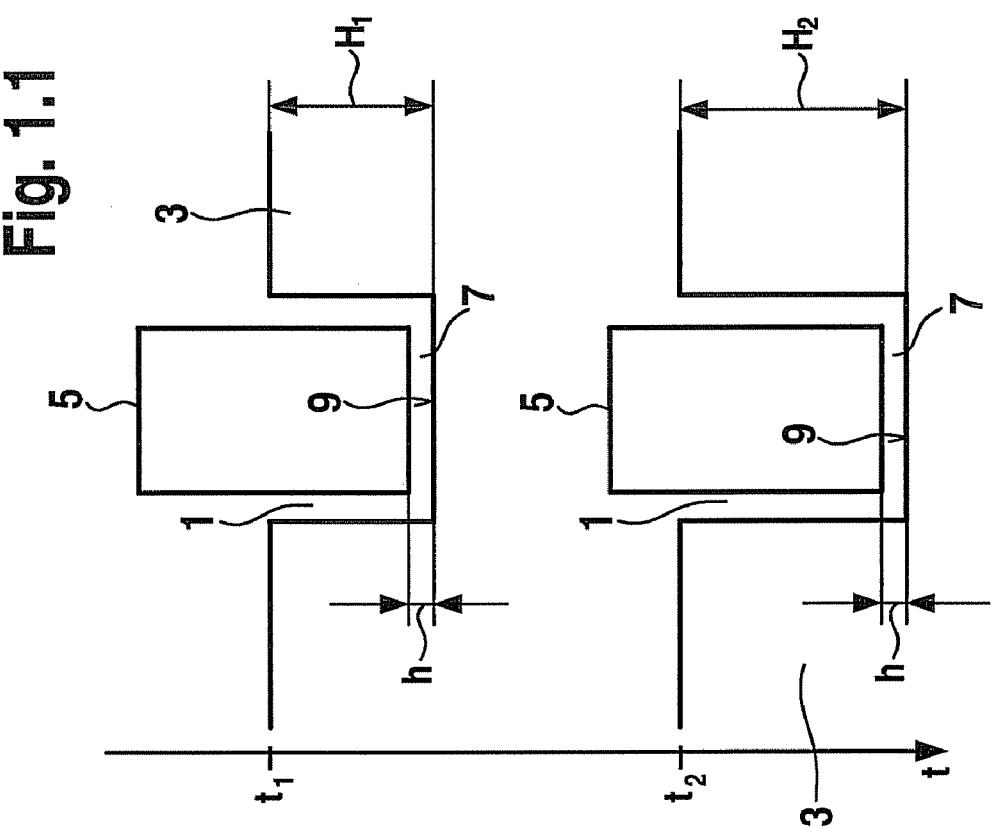

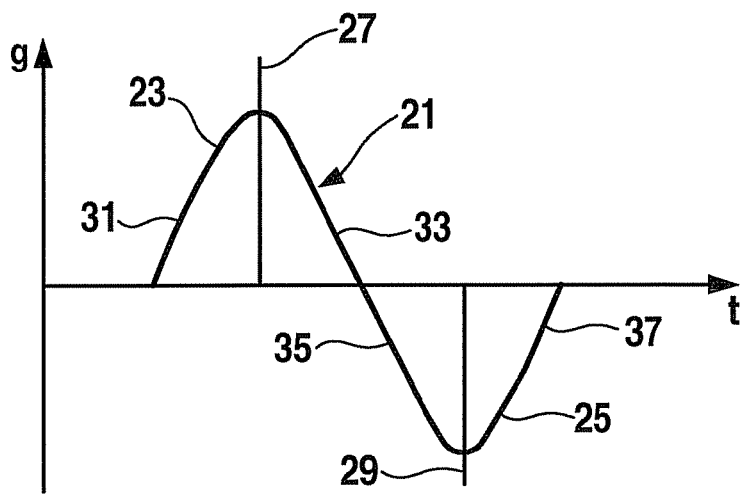
Fig. 3.1
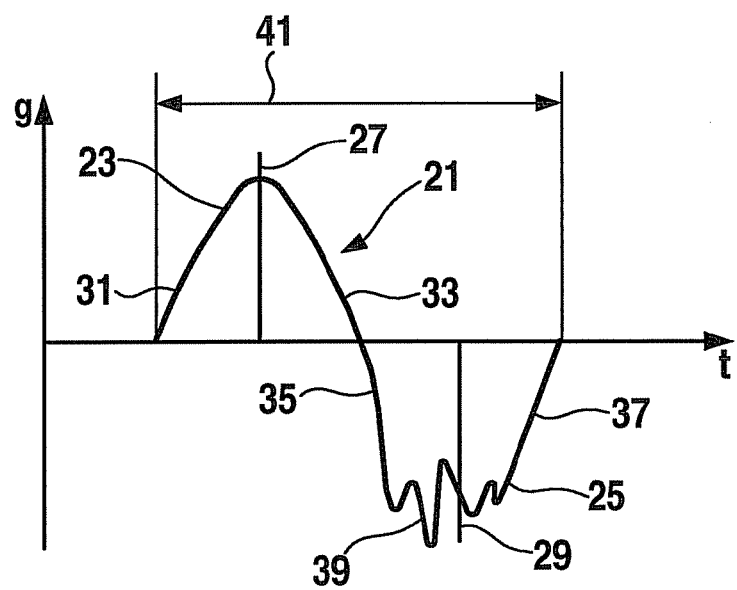
Fig. 3.2
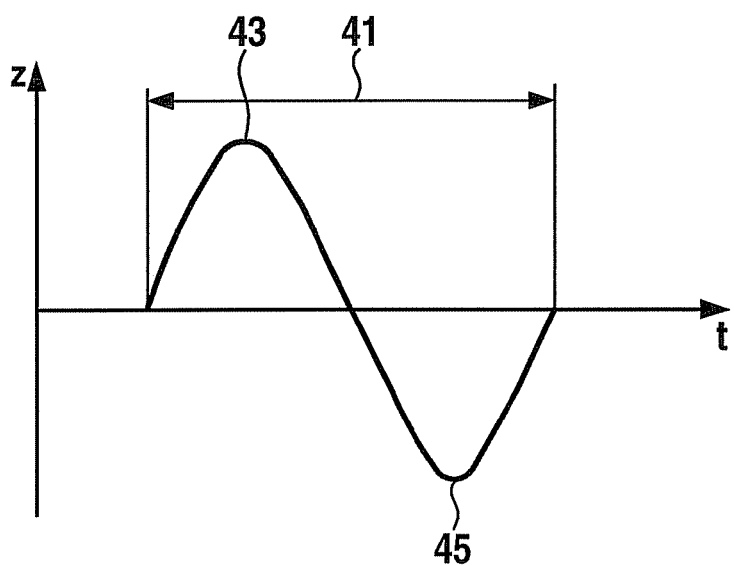
Fig. 3.3

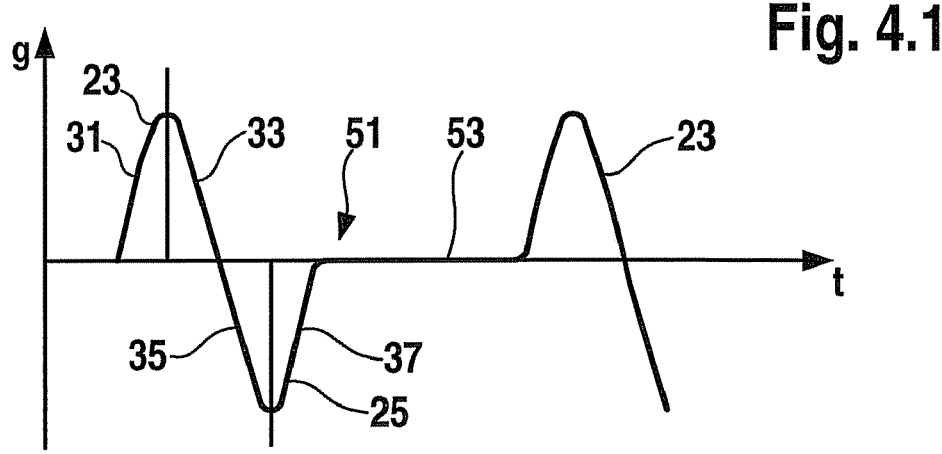
Fig. 4.1
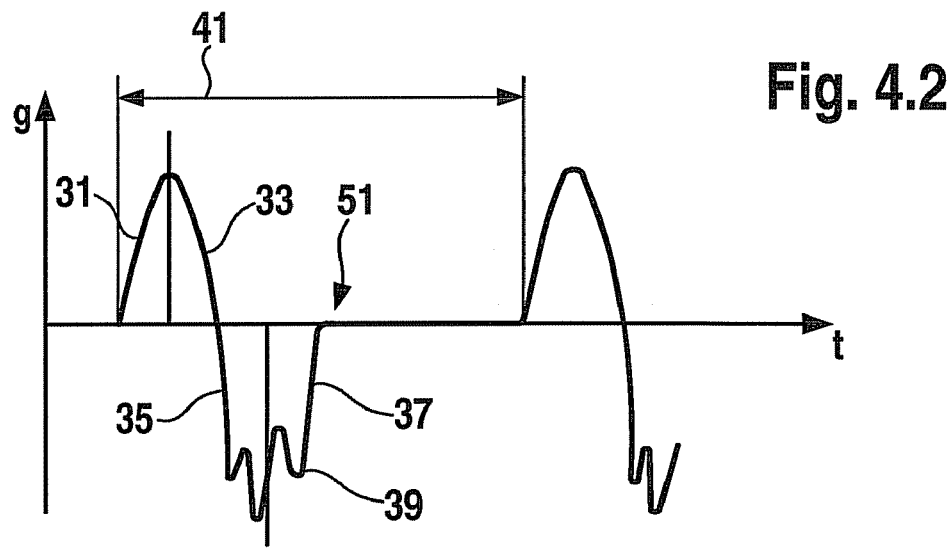
Fig. 4.2
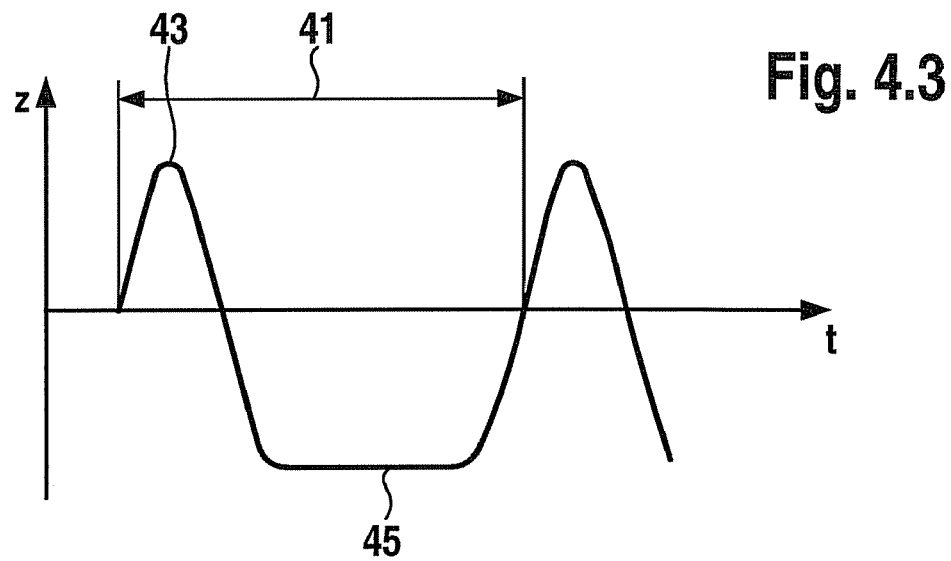
Fig. 4.3

METHOD FOR SETTING A DISTANCE BETWEEN AN ELECTRODE AND A WORKPIECE

FIELD OF THE INVENTION

The present invention relates to a method for setting a distance between an electrode and a workpiece in electrochemical metal working, the electrode being moved by an oscillating drive system.

BACKGROUND INFORMATION

Depressions having a specifiable geometry are able to be applied in metallic workpieces by electrochemical metal working (EMC). In order to avoid that the depression widens radially because of the dissolving of the walls, the working gap between the electrode and the workpiece is selected to be as small as possible. Oscillating electrodes are usually used for this purpose. These, in each case, emit a current pulse when the distance between the electrode and the workpiece is at its smallest. The gap between the workpiece and the electrode is designated as working gap, in this instance.

At this time, evaluations of the voltage signal or the current signal are used to regulate the working gap. Methods are also known which make use of the measurement of a resistance. These methods each permit a relative measurement and determination of a working gap. In doing so, they are based on the fact that the measured signals vary as a function of the magnitude of the working gap. Thus, the resistance goes down with a decreasing working gap, for example.

The disadvantage of the methods in which the working gap arises from the evaluation of the voltage signal or the current signal, or from measurements of the resistance is that the measured signals depend on the state of the electrolyte in the working gap. Thus, the composition of the electrolyte changes, for instance, during the processing, that is, during the time a current or voltage pulse is applied to the electrodes. This change takes place, for example, by the electrolysis of the water or the solution of metal ions from the workpiece. The result is a superposition of the effects of the approach, for instance, the reduction in the measured resistance with falling gap size, with effects of the processing itself, such as an additional reduction in the resistance caused by an increase in the conductivity of the electrolyte by the absorption of dissolved metal ions.

SUMMARY

The method according to example embodiments of the present invention for setting a distance between an electrode and a workpiece in electrochemical metal working, the electrode being moved by an oscillating drive system, includes the following: (a) picking up an acceleration signal of the oscillating drive system, (b) separating the acceleration signal into individual sections, (c) determining characteristic magnitudes of the individual sections of the acceleration signal, (d) comparing the characteristic magnitudes, determined in (c), of the individual sections with one another, (e) adjusting the distance of the electrode from the workpiece in response to a deviation of the characteristic magnitude from the specified values.

The advantage of setting the distance by evaluating the acceleration signal is that the distance determination is independent of the electrical conditions, such as the conductivity or the processing parameters.

The acceleration signal of the oscillating drive system generally has a simple structure, which makes possible a simple and robust evaluation logic. What is made use of is that, because of the oscillation motion, pressures develop in the depression, and with that, forces which counteract the motion of the oscillating drive system. These pressures developed by the system itself are proportional to the distance between the workpiece and the electrode, in this connection. With a decreasing distance, distortions in the acceleration response come about, based on the actions of the forces of the drive system and the pressures in the workpiece. These distortions are able to be measured in a simple manner. A usual oscillating drive system includes a drive axis at which the accelerations are able to be recorded with the aid of an acceleration sensor.

In an example embodiment, the sections, into which the acceleration signal is subdivided in step (b), are four quarter curves of an oscillation period. Such an oscillation period is usually sinusoidal, trapezoidal or rectangular. Furthermore, it is also possible that an oscillation period includes a rest phase, in which the electrode is not moved. In the case of a regular oscillation motion, an upper and a lower half-wave usually come about. By determining the midpoints of the two half-waves, quarter-waves are able to be determined. In the case of a regular oscillating motion, the absolute values of the integrals of the four quarter-waves are identical. The envelope curves are also identical, they being in each case able to be mirrored across an axis. Such a regular oscillation curve, in which the integrals of the four quarter-waves have the same absolute value, the envelope curves are identical and the derivatives each have the same absolute value is present if the distance between the electrode and the workpiece is so great that no pressure forces act on the electrode in the depression. As soon as the pressure forces act on the electrode, distortions come about in the second half-wave, that is, the half-wave at which the electrode reaches its lowest distance from the workpiece.

The characteristic magnitudes that are determined in step (c) are preferably determined by integration, differentiation and the forming of envelope curves of the quarter-waves.

In an example embodiment, the characteristic magnitudes that have been determined in step (c) are compared to specified values, for determining the distance. The specified values to which the characteristic magnitudes are compared may be ascertained, for example, by a calibration. If the characteristic magnitudes deviate from the specified values, the distance of the electrode from the workpiece may be adjusted. If, for instance, it is recognized, from the deviation of the characteristic magnitudes from the specified values, that the distance between the electrode and the workpiece is too great, this distance may be diminished. In a corresponding manner, if the distance is too short, it may also be prolonged.

Instead of the calibration by which the specified values are ascertained, it is also possible to store regulating sets for certain magnitudes in the controller, for instance, the integrals of the quarter-waves, and to carry out the regulation based on these regulating sets.

In order to perform the calibration for ascertaining the specified values to which the characteristic magnitudes are compared, the distance of the oscillating electrode from the floor of the depression having a known depth, is set, for instance, for different depths of immersion, and the acceleration signal is picked up at the respective specified distance.

Example embodiments of the present invention also relate to a device for carrying out the method, including an electrode, that is connected to a drive axis, an oscillating motion being able to be transferred to the electrode via the drive axis.

A sensor is situated on the drive axis which picks up acceleration signals. The sensor is preferably connected to an evaluation unit in which the acceleration signals are able to be evaluated. One is able to achieve thereby an automated setting of the distance between the electrode and the workpiece.

Exemplary embodiments of the present invention are shown in the drawings and explained in greater detail in the following description.

BRIEF DESCRIPTION OF THE DRAWINGS

FIG. 1.1 illustrates development of the depression in the case of a small working gap, FIG. 1.2 illustrates development of the depression in the case of a large working gap.

DETAILED DESCRIPTION

Figure 2:
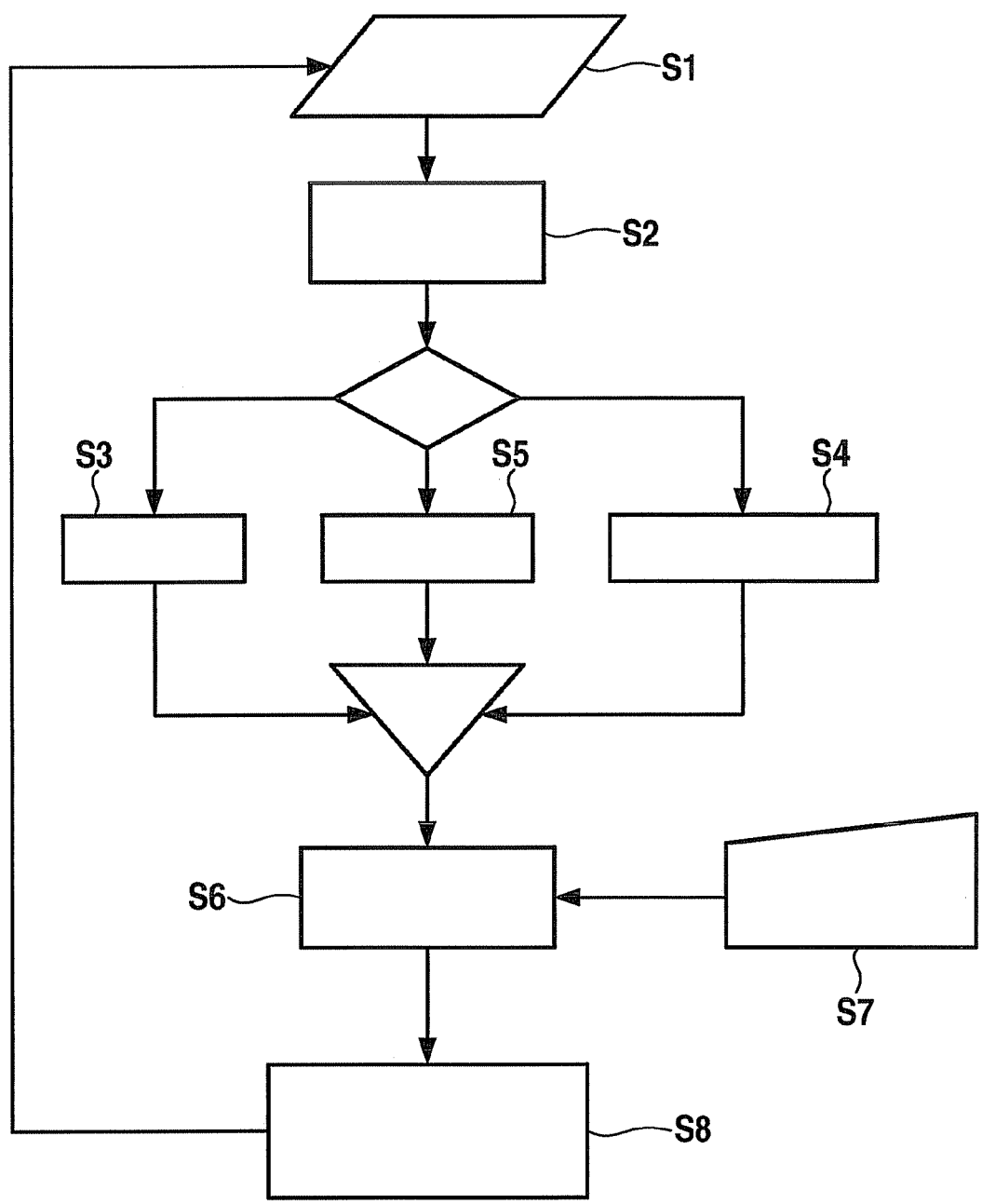
FIG. 2 illustrates sequence schematic as a flow chart, FIG. 3.1 illustrates an acceleration signal without distortions, FIG. 3.2 illustrates an acceleration signal having distortions, FIG. 3.3 illustrates a distance of the axis traveled, FIG. 4.1 illustrates an acceleration signal without distortions having a stopping of the oscillatory motion, FIG. 4.2 illustrates an acceleration signal having distortions in the case of an oscillatory motion that has been stopped, FIG. 4.3 illustrates a distance of the axis traveled in the case of an oscillatory motion that has been stopped.

FIG. 1.1 shows the development of a depression in a workpiece when there is a small working gap.

In order to generate a depression 1 in a workpiece 3, an electrode 5 is sunk into workpiece 3. In order for depression 1 to be able to develop by the sinking of electrode 5 into workpiece 3, the workpiece is connected as an anode and the electrode as a cathode. A current flows between workpiece 3 and electrode 5, so that workpiece 3 dissolves in the area of electrode 5 and forms depression 1. Electrode 5 is generally moved by an oscillating drive system. A working gap 7 between electrode 5 and the workpiece 3 thereby increases and decreases in size. At the time, in each case, at which working gap 7 has reached its smallest distance h, at least one current pulse/voltage pulse is emitted by electrode 5. Because of this, workpiece 3 dissolves at floor 9 of the depression. Depression 1 is driven further forwards in workpiece 3.

At time $t_1$, depression 1 has a first depth $H_1$. At a second point, which occurs later than time $t_1$, depression 1 has a depth of $H_2$. A widening of depression 1 does not take place when working gap 7 is small, as is shown in FIG. 1.1.

FIG. 1.2 shows the development of the depression in the case of a large working gap.

At time $t_1$ depression 1 has the same shape as at time $t_1$ in FIG. 1.1. However, the at least one current pulse/voltage pulse is emitted by electrode 5 at a greater working gap 7. As a result, depression 1 also becomes wider laterally. At time $t_2$, the depression generated in FIG. 2 has the same depth $H_2$ as depression 1 at time $t_2$ in FIG. 1.1. However, at time $t_2$, in the depression shown in FIG. 1.2, sidewalls 11 of depression 1 have dissolved, so that depression 1 has become greater laterally. For this reason, the processing while using a large working gap 7, as shown in FIG. 1.2, is not as precise as processing while using a small working gap 7, as shown in FIG. 1.1.

Consequently, for precise processing it is advantageous if working gap 7 is selected to be as small as possible, and distance h between workpiece 3 and electrode 5 is able to be monitored during the generation of depression 1, and reset if necessary.

FIG. 2 shows a sequence schematic of the method according to example embodiments of the present invention, for setting the distance between the electrode and the workpiece, as a flow chart.

In a first step S1, an acceleration signal is picked up. The acceleration signal is determined, for example, at a drive axis of electrode 5, with the aid of an acceleration sensor. However, it is also possible to pick up the acceleration signal directly at electrode 5. Based on the oscillating motion of electrode 5, the acceleration signal also has an oscillating course.

In a second step S2, quarter-waves are formed from the acceleration signal for an oscillation period. For this purpose, first of all the upper and the lower half-wave of the acceleration signal are identified. After the identification of the upper and the lower half-wave, the midpoints of the half-waves are determined. The midpoints of the half-waves each separate two quarter-waves.

From the quarter-waves that have been determined in step S2, characteristic magnitudes are first determined. For this purpose, the four quarter-waves are integrated, for example, in a step S3, and differentiated in a step S4. In a step S5, the envelope curves of the quarter-waves are also determined. The characteristic magnitudes ascertained in steps S3, S4 and S5 are evaluated in a step S6. The evaluation may take place, for example, by comparing the calculated values for the quarter-waves to one another. Furthermore, it is also possible to draw upon specified values for the evaluation, to which the characteristic magnitudes formed in steps S3, S4 and S5 may be compared. The specified values may be ascertained, for instance, by a calibration. In the flow chart shown in FIG. 2, the specification of values is shown by step S7.

In a final step S8, the process parameters may be modified as a function of the evaluation carried out in step S6. Thus, if the evaluation says, for instance, that working gap 7 is too large for precise processing, an additional advance of electrode 5 may take place so as to diminish working gap 7 again. When working gap 7 is too small, it is also possible slightly to enlarge the distance between workpiece 3 and electrode 5 again. In the case of too small a working gap 7, there is the danger that workpiece 3 and electrode 5 touch, and that a short circuit comes about.

For the calibration in order to ascertain the values to be specified, for comparison to the characteristic magnitudes during processing, the acceleration signals for a plurality of known distances between the electrode and the workpiece are recorded, for example. This is done, for instance, by inserting electrode 5 into a depression 1 that has a known dimension, until electrode 5 touches floor 9 of depression 1. Electrode 5 is subsequently retracted by a specified path length. After the retraction of electrode 5, the oscillating motion is started and the acceleration signal is picked up. After the pick-up of the acceleration signal, the oscillating motion is ended, and electrode 5 is again retracted by a specified path length. The distance between electrode 5 and workpiece 3 is further increased thereby. The oscillating motion is then started again, and the acceleration signal is picked up at the increased distance. This procedure is repeated until a sufficient number of measured points is obtained. The number of measured points is dependent upon the processing situation, in this context. The signal curves thus picked up are then evaluated, and a calibration function may be set up.

Using the method according to example embodiments of the present invention, it may also be detected whether a breakthrough has been generated. The breakthrough detection is based, in this instance, on the fact that the pressure conditions in depression 1 change suddenly if a breakthrough through the floor of workpiece 3 is created, and the liquid contained in depression 1 is able to drain away. In order to detect the point in time when the breakthrough occurs, the change in the calculated characteristic magnitudes in comparison to the previously determined characteristic magnitudes is permanently controlled, and, in the case of a breakthrough, the steps required for achieving a specified workpiece geometry can be initiated. If a breakthrough in a workpiece is to be achieved by the electrochemical metal working, it may be ascertained by the breakthrough detection whether the workpiece that is to be processed has the correct measurements. If the breakthrough through the workpiece takes place too early, for example, this says that the thickness of the workpiece is too low. In the same manner, it is recognized that the workpiece is too thick if the breakthrough takes place too late. When it is indicated that the breakthrough has occurred too early or too late, the faulty workpiece may thus be rejected.

FIGS. 3.1 to 3.3 show an acceleration signal having no distortions, an acceleration signal having distortions and the distance traveled along the axis in an oscillating motion without stopping.

In FIGS. 3.1 and 3.2, the acceleration is shown in each case on the ordinate, and time on the abscissa, and in FIG. 3.3, the path is shown on the ordinate and time on the abscissa.

A curve like the one shown in FIG. 3.1 comes about for an oscillating period if the distance between workpiece 3 and electrode 5 is long. Because of the great distance, no pressure forces act upon electrode 5 that have a visible influence on the acceleration. Thus, in the case of a sinusoidal oscillating motion, one also obtains a sinusoidal curve of acceleration signal 21. The acceleration signal 21 for an oscillating period is able to be divided into a positive half-wave 23 and a negative half-wave 25. The midpoint of half-waves 23, 25 is determined in each case.

Midpoint 27 of half-wave 23 divides positive half-wave 23 into a first quarter-wave 31 and a second quarter-wave 33. Midpoint 29 of negative half-wave 25 divides it into a third quarter-wave 35 and a fourth quarter-wave 37. In the case of a uniform oscillating motion, the absolute values of the integrals of the four quarter-waves 31, 33, 35, 37 are identical. The absolute values of the derivatives of the four quarter-waves 31, 33, 35, 37 are identical. In addition, no sign changes occur in the derivatives of the four quarter-waves 31, 33, 35, 37. The envelope curves of the four quarter-waves 31, 33, 35, 37 are also identical.

Acceleration signal 21 shown in FIG. 3.2 differs from the one shown in FIG. 3.1 by distortions 39 in negative half-wave 25. Distortions 39 lead to different integrals, differentials and envelope curves of third quarter-wave 35 and fourth quarter-wave 37. In the derivatives, sign changes occur based on distortions 39. The magnitude of the distortions is a function of the distance of electrode 5 from workpiece 3.

FIG. 3.3 shows the path traveled by electrode 5 over one starting point. During one oscillating motion, during a period length 41, electrode 5 is first moved away from workpiece 3 until it reaches an upper inversion point 43. At upper inversion point 43, the motion of electrode 5 is reversed. Electrode 5 moves in the direction towards workpiece 3. At a lower inversion point 45, at which the distance between electrode 5 and workpiece 3 is at its lowest, the motion of electrode 5 is changed again, and electrode 5 moves away from workpiece 3 again. At lower inversion point 45, the distance between electrode 5 and workpiece 3 is at its lowest. The current pulses or voltage pulses required for the electrochemical metal working are advantageously emitted when the lower inversion point is reached. The electrode executes a uniform motion, even in response to a low distance between electrode 5 and workpiece 3. Distortions 39, which occur in acceleration signal 21, have no measurable influence on the motion of electrode 5.

FIGS. 4.1 and 4.2 show acceleration signals in response to an oscillating motion of the electrode having stopping times.

Acceleration signals 51 of electrode 5, having stopping, differ from acceleration signals 21 of electrode 5 having oscillating motions, without stopping, in that, between a negative half-wave 25 and subsequent positive half-wave 23, the value of the acceleration during the stopping time is equal to zero. This is shown in the diagram according to FIG. 4.1 by zero line 53. In order to determine the characteristic magnitudes, the stopping time period of motion signal 51 is not taken into account. Positive half-wave 23 and negative half-wave 25, which are picked up by the acceleration sensor while the electrode is in motion, are divided into four quarter-waves 31, 33, 35, 37, same as for oscillating motions without stopping times, as are shown in FIGS. 3.1 to 3.3. Of the four quarter-waves 31, 33, 35, 37, in turn, the integrals, derivatives and envelope curves are formed which are drawn upon as characteristic magnitudes for the evaluation. As in the case of motion without stopping times, as shown in FIGS. 3.1 to 3.3, acceleration signal 51 is also not distorted during oscillating motion having stopping times when there is a large distance between electrode 5 and workpiece 3. Distortions 39 occur in this case too, if the distance between workpiece 3 and electrode 5 is small. This is depicted in FIG. 4.2.

In the case of the oscillating motion having stopping, as shown in FIGS. 4.1 to 4.3, period length 41 also includes the stopping phase, although this is not drawn upon for determining the characteristic magnitudes.

The signal of the path traveled of electrode 5 in response to an oscillating motion having stopping is shown in FIG. 4.3. One may see in this case that the stopping takes place at the lower inversion point 45. The advantage of the stopping of electrode 5 at lower inversion point 45 is that a longer processing time is made possible. A more effective processing is made possible.

Instead of the sinusoidal motions of electrode 5 shown in FIGS. 3.1 to 3.3 and 4.1 to 4.3, the method according to the present invention may also be used for any other uniform oscillating motion desired. Thus, the oscillating motion may, for instance, be rectangular, trapezoidal, in the form of a rounded rectangle or any other form known to one skilled in the art. To use the method according to example embodiments of the present invention, it is only required that a periodic motion of electrode 5 is present.

What is claimed is:

1. A device, comprising:
   an electrode connected to a drive axis,
   an acceleration sensor arranged on the drive axis for measuring acceleration signals, and
   an evaluation unit including logic adapted to:
      subdivide an oscillation period of the acceleration signals into four quarter curves,
      determine characteristic magnitudes of the four quarter curves by integration, differentiation, and a forming of envelope curves,
      compare the characteristic magnitudes to predetermined values; and
      calculate a distance adjustment of the electrode from a workpiece based on the comparing.

2. The device according to claim 1, wherein the acceleration sensor is connected to the evaluation unit adapted to evaluate the acceleration signals.

* * * * *

UNITED STATES PATENT AND TRADEMARK OFFICE
CERTIFICATE OF CORRECTION

PATENT NO. : 8,372,252 B2
APPLICATION NO. : 12/305527
DATED : February 12, 2013
INVENTOR(S) : Gruhn et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 934 days.

Signed and Sealed this
First Day of September, 2015

Michelle K. Lee
*Director of the United States Patent and Trademark Office*